Figure 1:
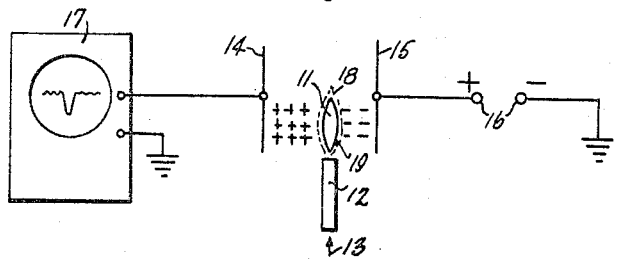

Inventor
Theodore A. Rich
by Charles W. Helzer
His Attorney

United States Patent Office 3,330,960
Patented July 11, 1967

3,330,960
FLAME SPECTROPHOTOMETER USING IONIZATION CURRENT DETECTION
Theodore A. Rich, Scotia, N.Y., assignor to General Electric Company, a corporation of New York
Filed Oct. 8, 1963, Ser. No. 314,714
12 Claims. (Cl. 250—218)

The present invention relates to a new and improved particle detector.

More specifically, the invention relates to a particle detector capable of counting aerosol particles in the atmosphere in extremely small numbers, and which is also capable of detecting aerosol particles formed from a selected element or from particles formed from some selected chemical composition.

In conducting air pollution studies, it is often desirable to be able to count small particles present in the air (referred to as aerosol particles or condensation nuclei) even in circumstances where the numbers of such particles present in the atmosphere are extremely small and where the particles are small in size. Often it is desirable to detect the presence of even a single particle in an atmosphere which itself may be very small on the order of 0.1 of a micron in radius. Presently available particle counters or condensation nuclei meters are the type which measure gross effects of particles, but are not adapted to the accurate measurement of the event of a single particle, or even measurement of extremely dilute quantities of particles in an atmosphere such as one particle per cubic centimeter of a given gas. Also it is desirable to identify the size of the particle as well as its presence, and presently available counters are not readily adapted to this purpose. Additionally, it is often desirable to know whether a particle being detected is formed from a particular element or some particular chemical composition, at the same time that its presence is ascertained. To satisfy these needs, the present invention was devised.

It is therefore a primary object of the present invention to provide a new and improved particle detector which is sufficiently sensitive to detect the presence of only a single small particle in at atmosphere being monitored as well as large numbers of such particles.

Still another object of the invention is the provision of a particle detector capable of sensing a single particle's presence in an atmosphere, and simultaneously determining whether the particle is formed from a selected substance, and/or deriving some measurement of its size, if such information is desired.

In practicing the invention, a particle detector is provided which includes in combination a source of flame combustion, means for introducing a sample of an atmosphere to be monitored into the zone of flame combustion together with means for applying an electric field across the zone of flame combustion. The particle detector is completed by measuring means which are operatively coupled to the electric field applying means for deriving an output indication of each individual particle present in the atmosphere being monitored. If along with the total number of particles counted, it is desired to know whether particles of a given chemical composition are present in the atmosphere being monitored, the particle detector is designed to further include photosensitive means positioned to view the zone of flame combustion for this purpose. Light filter means are positioned intermediate to the photoconductive means at the zone of flame combustion for passing only light within a selected spectral region to the photosensitive means. When thus modified, the particle detector includes second measuring means operatively coupled to the output of the photosensitive means for deriving an output indication of the number of particles in the atmosphere being monitored which emit light in the selected spectral region. Since it is known that certain elements will emit characteristic light that lies within predetermined regions of the spectrum, by thus detecting the emitted light upon the particle being burned in the flame, it is possible to identify the presence of such an element in the particle being detected. By the inclusion of a square law detector, or some integrating type of measurement device for obtaining the cube of the response, it is possible to derive signals representative of the size of the particle being detected.

In a preferred form of the new and improved particle detector, the photosensitive means mentioned above comprises a plurality of photosensitive devices positioned to view the flame zone through respective selective light filters designed to pass light only within a selected spectral region, with the filters associated with the different photosensitive devices being designed to measure different spectral regions. Coincidence circuit means are operatively coupled to the outputs of the photosensitive devices and to the measuring circuit means for gating on the measuring circuit means in response to concurrently produced output signals appearing in the outputs of the photosensitive devices. By this arrangement, it is possible to detect particles occurring in the atmosphere being monitored which are composed of two or more different elements which emit characteristic light in predetermined spectral regions thereby identifying the presence of these elements in the composition of the particle detected.

Figure 2:
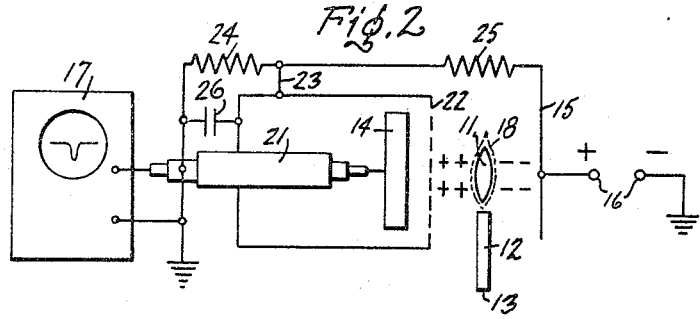
Figure 3:
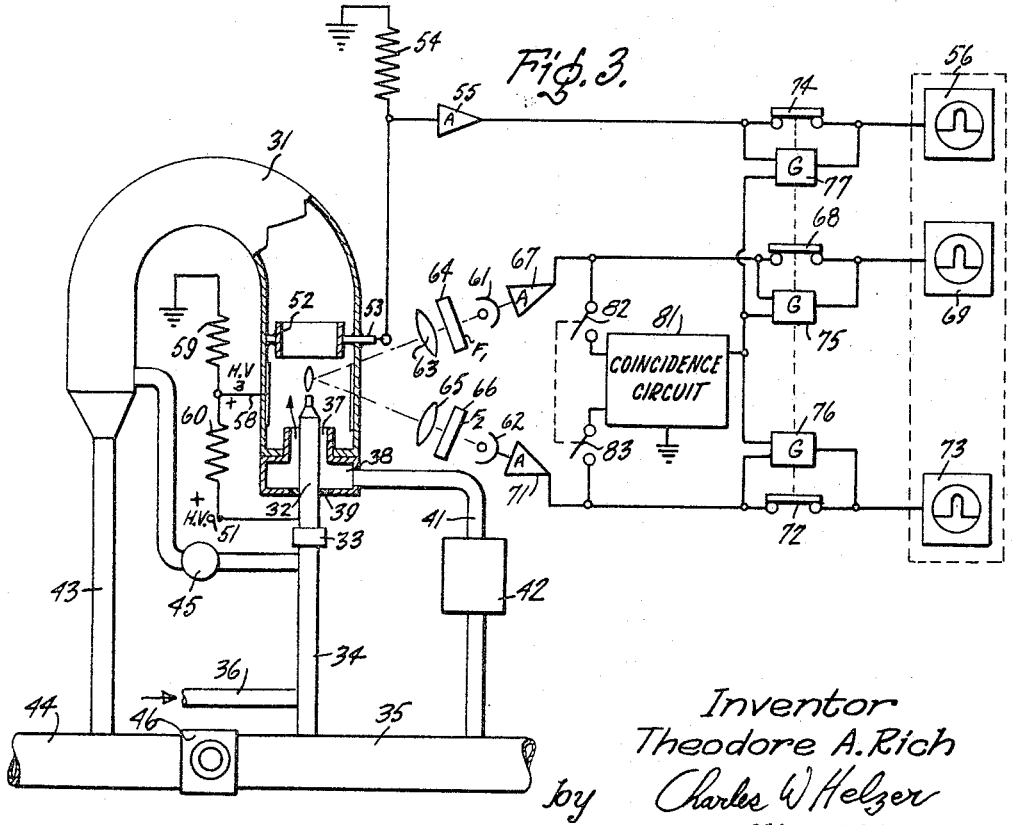

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIGURE 1 is a schematic diagram of a new and improved particle detector constructed in accordance with the invention;

FIGURE 2 is a schematic diagram of an improved version of the particle detector illustrated in FIGURE 1; and FIGURE 3 is a schematic diagram of a preferred form of a particle detector constructed in accordance with the invention which is capable of obtaining not only a count of the individual particles present in an atmosphere being monitored and their size; but also it is capable of identifying particles of a given chemical composition which are detected.

The particle detector shown in FIGURE 1 of the drawings is comprised by a source of flame combustion having a flame zone indicated at 11 which is supported at the end of a conduit 12 to which a suitable source of fuel and air is supplied at the inlet end as indicated by the arrow 13. In addition to fuel and air supplied to end 13, a sample of the atmosphere to be monitored is also supplied through inlet 13 in conduit 12 to the zone of flame combustion 11. The zone of flame combustion 11 is disposed between two spaced apart electrodes 14 and 15 which serve to apply an electric field across the zone of flame combustion. For this purpose, the electrode 15 is connected through terminals 16 to a source of high voltage direct current potential that in turn may have one terminal grounded. For most purposes, the source of high voltage direct current electric potential 16 may be from 2 to 5 kilovolts in value. The electrode 14 is connected directly to a measuring means 17 which may comprise an oscilloscope, peak reading volt meter, or peak voltage recorder or other suitable means which will serve to indicate increased current pulses applied thereto from the electrode 14. The electrodes 14 and 15 may comprise nothing more than square stainless steel plates, and the conduit 12 may comprise a stainless steel tube through which the fuel and air supply being monitored is delivered to the zone of flame combustion 11. The flame 11 may be initiated by any means such as an electric arc to assure combustion is initiated and maintained within the zone 11 as indicated. Alternatively, conduit 12 may comprise a small quartz tube through which hydrogen or some other suitable combustible fuel is supplied along with the sample of the atmosphere being monitored.

In operation, with the flame 11 being sustained at the end of the conduit 12 in the space between the electrodes 14 and 15, a high temperature zone will exist around the flame as indicated by the dotted lines 18. Upon a particle to be detected occurring in the atmosphere being monitored, entering the high temperature zone 18, it will be heated to incandescence and will burn emitting a bright light flash as indicated by the sparks 19. Upon the particle being heated to such a high temperature, it is excited to the point of also emitting some electrons. These electrons in traveling through the high temperature zone 18 will collide with molecules of the gas within this space, and will ionize the molecules. Ionization of the molecules of gas within the high temperature space 18 results in the production of ion pairs in large numbers indicating that a sort of avalanche process takes place as a result of the collision with the excited electrons emitted by the high temperature particle 19. These ion pairs are drawn off to the respective electrodes 14 and 15 in the manner indicated by the plus (+) and minus (—) signs due to the fact that the high potential applied to the electrode 15 is positive, and hence will attract the negative ions; and, in order to maintain the flame zone electrically neutral, the positive ions will be attracted to the remaining electrode 14 which essentially is at ground potential. As a consequence of this process, collection of the avalanche produced positive ions on the electrode 14 will result in the production of an output ionization current signal pulse which will be recorded by the measuring instrument 17. Since this avalanche process of producing large numbers of negative and positive ions takes place for each individual particle 19 introduced into the high temperature flame zone 18 and 11, then it follows that the particle detector illustrated in FIGURE 1 actually serves to develop an output signal pulse for each individual particle 19 that occurs in the atmosphere being sampled. Accordingly, it can be appreciated that the instrument shown in FIGURE 1 provides not only an indication of the gross aspects of large numbers of particles present in an atmosphere being monitored, but also is capable of recording each event of a particle 19 occurring in the atmosphere being monitored. As a consequence, the detector is capable of counting even a single small particle as long as it reaches the high temperature region, and most assuredly is capable of detecting particles in dilute mixtures such as the occurrence of a single particle in a volume of one cubic centimeter of gas.

FIGURE 2 of the drawings shows an improved version of the flame particle detector constructed in accordance with the invention. The species of the invention shown in FIGURE 2 of the drawings, is designed to minimize the effect of variations in the power supply 16 on the reading obtained by the measuring means 17. The flame particle detector of FIGURE 2 is comprised by a conduit 12 through which a suitable source of fuel, and a sample of the atmosphere being monitored is supplied and burned in a flame zone of combustion 11 disposed between spaced apart electrodes 14 and 15. The electrode 15 has a source of high potential 16 connected to it for applying a positive voltage to the electrode 15. Electrode 14 is connected through an insulating support 21 to the input of a measuring means 17 that may comprise an oscilloscope, a peak reading volt meter, or a peak recorder of conventional construction. Disposed between the collecting electrode 14 and the flame zone 11 is a screen electrode 22 which is electrically connected through a connection 23 to the tap point of a pair of voltage dividing resistors 24 and 25 connected between the positive terminal of the high voltage supply 16 and ground. The screen electrode 22 is physically supported by the insulating support 21, and is electrically connected to one plate of a capacitor 26 whose remaining plate is grounded. By this arrangement, instantaneous variations in the power supply 16 which might cause the potential of the point 23 to vary, will be damped out by the capacitor 26 which has a sufficiently large capacitance to cause the screen 22 to seek a potential representing a normal median value for the tap point of the voltage dividing resistors 24 and 25.

During operations of the flame particle detector shown in FIGURE 2, particles supplied through the conduit 12 and entering the high temperature zone 18 surrounding the flame 11 will be ignited in the previously described manner, and thereby emit electrons having a high energy state. These emitted electrons will strike molecules of gas in the high temperature space 18, and in the collision process will form ion pairs. The formation of the ion pairs will produce a stream of negative ions that are collected on the electrode 15, and an equal number of positive ions will be drawn to the screen 22, and thence to the collector electrode 14. The collection of the positive ions on the collector electrode 14 will produce a signal pulse that will be indicated by the measuring instrument 17 in the previously described manner. It should be noted that the positive ions will be pulled to the screen 22 by the voltage existing between the flame 11 and the screen 22, and, except for those ions intercepted by screen 22, will then be pulled to the collector electrode 14 by the voltage existing between the collector electrode 14 and the screen 22. The voltage of the flame 11 with respect to ground is self adjusting so that the positive and negative ion currents will be maintained equal. As a consequence of this phenomena, output signal pulses will be produced on the electrode 14 which are representative of particles in the atmosphere being monitored, and which will be recorded by the measuring instrument 17. These signal pulses will not vary with instantaneous variations in the power supply 16 so that by the arrangement of FIGURE 2, considerable noise may be eliminated from the output signal pulses supplied to the measuring instrument 17.

FIGURE 3 of the drawings illustrates a preferred form of the new and improved flame particle detector suitable for use not only in obtaining a total count of all the particles entrained in an atmosphere being monitored and their size, where desired; and which also is capable of identifying the existence of particles formed from particular substances in the atmosphere being monitored. The particle detector of FIGURE 3 is comprised by a combustion chamber formed by a tubular glass envelope 31 bent in the form of a horseshoe, and having an electrically conductive supply conduit 32 extending into one of its ends. The electrically conductive conduit 32 has an opening or tip having a diameter of about .012 inch formed in its end through which a combustible mixture of the atmosphere being monitored and a suitable fuel is supplied to the combustion chamber 31. This combustible mixture is caused to burn supporting a flame 11 in a flame zone of combustion similar to that described with relation to the embodiments of the invention shown in FIGURES 1 and 2. For this purpose, the conduit 32 is connected through an electrically insulating coupling 33, and extension 34 to a sample intake piping system 35, with a source of fuel (such as hydrogen) being supplied through a branch pipe 36 connected to the extension 34. The conduit 32 passes through an annular opening 37 in the base of the glass envelope combustion chamber 31 which annular opening communicates with a manifold 38 formed on the bottom of the glass envelope 31. The manifold 38 is electrically insulated from the conduit 32 by a suitable insulated ring 39 and is connected through a supply pipe 41 and filter arrangement 42 to the sample inlet supply line 35. By this arrangement, clean filtered air is supplied from the manifold 38 through the annular opening 37 past the flame zone of combustion 11 in order to ensure complete combustion of all fuel, air and any particles entrained in the air sample being monitored. The products of combustion are drawn off through the horseshoe-shaped tubular glass envelope 31 by means of an exhaust pipe 43 connected to the combustion chamber 31 and to an exhaust piping system 44 that in turn is exhausted by an exhaust fan or suitable evacuation system. In order to maintain optimum gas flow conditions through the glass envelope 31, a pressure measuring instrument 45 may be connected between the extension 34 of the supply conduit and the exhaust end of the glass envelope 31. Also, a pressure regulating valve 46 may be connected between the supply piping 35 and the exhaust piping 44. An example of suitable flow rates for the system described above would be 100 cubic centimeter/sec. in the sample supply conduit 35 (assumed to be air), 2 cc./sec. of hydrogen in the branch pipe 36, 1 cc./sec. in supply conduit 32, and 15 cc./sec. through filter 42 and manifold 38; however, it is to be expressly understood that these values are exemplary only, and that the invention is in no way restricted to operation at these values.

A means is provided for applying a high potential to the electrically conductive supply conduit 32. This means comprises a terminal 51 which is directly connected to a suitable high voltage supply having a value of from 2–5 kilovolts and to the supply conduit 32. Spaced from the supply conduit 32 within the glass combustion chamber 31 is a cylindrical electrically conductive shell 52. The shell 52 is electrically connected through an output terminal 53 and load resistor 54 to ground. The load resistor 54 also is connected to the input of a high gain amplifier 55 (having a gain of about 200) whose output is supplied to a suitable measuring instrument 56. In a preferred embodiment of the invention, the inner surfaces of the glass envelope 31 surrounding the flame zone 11 are covered with a transparent electrically conductive film shown at 57 which is electrically connected by a conductor 58 to the midpoint of a pair of voltage dividing resistors 59 and 60 connected between the high voltage terminal 51 and ground. The resistors 59 and 60 are adjusted so that the midtap point connected to the transparent electrically conductive surface 57 is approximately ⅓ the value of the high voltage potential applied to the terminal 51. This high voltage potential is itself greater than ⅓ the potential required to cause breakdown of the space within cylindrical shell 52. By this arrangement, the electrically conductive conduit 32 and the electrically conductive cylindrical shell 52 function to produce an electric field across the flame zone 11 in much the same manner as the spaced apart electrodes 14, 15 of the species of the invention shown in FIGURES 1 and 2.

As a result of the above arrangement, particles are detected in accordance with the following hypothesis. Upon a particle occurring in the gaseous atmosphere being monitored, such particle upon approaching the flame zone reaches a temperature high enough to cause electron emission before the particle reaches the high temperature flame zone. Since the electric field in this region is greater than ⅓ the voltage which would cause breakdown across the space, the electrons emitted are accelerated to the point where they produce ionization. As a consequence, the particle will become charged to a value limited by the applied field. Upon the particle thus charged entering the high temperature plasma zone, an equal charge is liberated to the collecting electrode resulting in the production of an output current pulse. The output current pulse caused by the collection of the charge on the collecting electrode produces a signal pulse across the load resistor 54 which will be amplified by high gain amplifier 55, and applied to the measuring instrument 56. In this manner, all aerosol particles above a given size contained in the gaseous medium being monitored will produce output indications on the measuring instrument 56 which of course may include a counter or other suitable recording mechanism for maintaining a count of the total number of particles occurring in the atmosphere being monitored. In this phase of the operation of the detector, the material from which the particle is formed is of second order importance. Different rates of emission with temperature will exist but this only affects the time it takes to charge the particle, and is measured in microseconds. The charge ultimately attained by the particle in the above-described manner is roughly proportioned to the diameter of the particle, and hence the current pulse produced can be used as an indicia of size. The shape of the current pulse produced, as opposed to its size, is a function of the flame geometry and the geometry of the collecting electrode. For example, with the detector shown in FIGURE 3, a current of approximately one (1) microampere is produced by a particle 2.5 microns in radius. The current pulses will be between 1 and 2 milliseconds long, and have a smooth rise and fall. The smallest particle than can be detected depends upon the noise of the flame and the power supply and while the practical size limit has not been established, particles .1 micron in radius have been detected. This sensitivity is deemed adequate for the present.

In addition to the above structure, photosensitive means comprising a pair of photomultiplier tubes 61 and 62 are positioned adjacent the glass envelope 31 to view the zone of flame combustion 11. The photomultiplier tube 61 views the zone of flame combustion 11 through a suitable lens 63 and light filter 64. Light filter 64 is designed to pass only light within a selected spectral region to the photomultiplier 61 so that the photomultiplier tube 61 in effect views only light falling within this selected spectral region. Concurrently, photomultiplier tube 62 views the flame zone of combustion through a lens 65 and second filter means 66 designed to pass only light within a selected spectral region with the filter 66 passing light from a different spectral region than the filter 64. As a result, the photomultiplier tube 62 will see only light passed to it by the filter 66 which lies within the selected spectral region of filter 66, and this light will be from a different spectral region than the light supplied to the photomultiplier tube 61. Suitable selective filters for this puropes are commercially available from such companies as the Baird Atomic Manufacturing Company, Cambridge, Mass., and may be designed to provide extremely sharp cut off characteristics with respect to the portion of the spectrum which it selectively passes.

The output from the photomultiplier tube 61 is supplied through a high gain amplifier 67 and a selector switch 68 to the input of a suitable measuring means 69. Similarly, the output of the photomultiplier 62 is supplied through a high gain amplifier 71, and a selector switch 72 to the input of a measuring instrument 73. The selector switches 68 and 72, together with a third selector switch 74 serve respectively to bypass the output of the amplifiers 67, 71 and amplifier 55 around a set of gating circuits 75, 76 and 77, respectively, connected to the inputs of the measuring instruments 69, 73 and 56, respectively. By this arrangmnt, when the selector switches 68, 72 and 74 are open, the gating circuits 75, 76 and 77 will be connected in the outputs of the amplifiers 67, 71 and 55 respectively, and are connected to the inputs of the respective measuring instruments 69, 73 and 56. The input terminals of the gating circuits 75, 76 and 77 are connected to the output of a coincidence circuit means 31 having its input terminals connected through selector switches 82, 83 to the outputs of the amplifiers 67 and 71, respectively. By this arrangement, it is possible to operate the particle detector of FIGURE 3 with the coincidence circuit means 81 connected in the output of the amplifiers 67 or 71, or by appropriate actuation of the selector switches remove the coincidence circuit from the outputs of the amplifiers, and read the output of the photomultipliers or collector electrode 52 with the appropriate measuring instrument. The measuring instruments 69, 73 and 56 are conventional peak reading volt meters, recorders or the like, and need not be described in detail.

In operation, the atmosphere to be monitored is supplied through the inlet piping 35 to the conduit 32 along with hydrogen supplied through the supply pipe 36. The mixture emitting from the tip of the conduit 32 is then initially ignited by a suitable electric arc or other means, and support a flame 11 within the zone of flame combustion. As described previously, upon the occurrence of a particle in the atmosphere being monitored, a pulse of ionization current will be drawn to the collector electrode 52 which results in the production of an output signal pulse across the load resistor 54. This output signal pulse can then be supplied through the high gain amplifier 55 and selector switch 74 to the measuring instrument 56. Simultaneously, the flame 11 is being viewed by the two photomultiplier tubes 61 and 62 through their respective filters 64 and 66. If, for example, the filter 64 is designed to view light emitted by the element sodium, for example, and the filter 66 is designed to pass light emitted by the element lithium, since each of these elements will emit characteristic light rays lying within a selected region of the visible spectrum, it is possible to use the output signal pulses produced by the two photomultiplier tubes 61 and 62 to identify the occurrence of sodium and lithium particles in the gaseous medium being monitored by the particle detector. Accordingly, during operation, the flame detector will serve to produce an output ionization current signal pulse through the amplifier 55 and its associated measuring instrument 56 upon the occurrence of every particle of a given size in the gaseous medium being monitored. If such a signal pulse occurs concurrently with a light signal pulse produced by the photomultiplier tube 61 for example, then it can be readily determined that the particle was a sodium particle. Similarly, if the ionization current signal pulse produced by amplifier 55 occurs concurrently with a light pulse produced by the photomultiplier 62, then it can be determined that the particle was a lithium particle. In practice, the light pulses produced are shorter in duration and occur after the particle reaches the high temperature plasma zone, in contrast to the ionization current. The peak of the light pulse occurs very nearly at the same time as the pulse from the ionization current. With a highly selective filter, the sensitivity can be improved since the filter cuts out noise due to the flame. With a suitable filter, particles which are less than .1 micron radius can be counted for those elements with substantial emission in discrete spectral lines.

If it is desired to detect particles formed from particular compositions of matter, for example a sodium-lithium particle, this can be accomplished by connecting in the coincidence circuit means 81 to the output of the two photomultiplier tubes 61 and 62 by appropriate actuation of the selector switches 82, 83 and selector switches 74, 68 and 72. With the particle detector thus arranged, the gating circuit 77 will block recording of all signal pulses except those which are capable of actuating the coincidence circuit 81. Since the coincidence circuit 81 will not be opened except when both the photomultiplier tubes 61 and 62 produce output signal pulses concurrently, it follows that no pulses will be counted except those signal pulses produced by particles which are comprised of both sodium and lithium. Upon the occurrence of such a particle, the filters 64 and 66 both will pass sufficient light to their associated photomultiplier tubes 61 and 62 to produce output signal pulses concurrently. The occurrence of the concurrent signal pulses will actuate coincidence circuit 81 which will open the gates 75, 76 and 77 to allow the signal pulses to be recorded by the associated measuring circuits 56, 69 and 73. Since these signal pulses are concurrent in time, they will be recorded simultaneously thereby indicating the presence of an aerosol particle comprised by the particular chemical composition sought. While sodium and lithium have been described as an example of a particular particle composition capable of detection by the particle detector arrangement of FIGURE 3, it is to be expressly understood that there are many other elements which will emit characteristic spectral lines, and that filters are available for viewing such spectral lines. Accordingly, the new and improved particle detector can be modified readily to observe and count particles formed from many different compositions of matter that might occur in an atmosphere being monitored.

From the foregoing description, it can be appreciated therefore that the invention provides a new and improved particle detector which is sufficiently sensitive to detect the presence of only a single particle in an atmosphere being monitored as well as large numbers of such particles. Additionally, in a preferred form of the invention, it is possible to sense not only single particles present in the atmosphere, but also to simultaneously determine whether the particular particle sensed is formed from a selected chemical substance. Further, while the more difficult task of counting individual particles has been illustrated and described, it is believed obvious that average currents could be measured where the particle population is high. The ionization current collecting scheme gives an average current which is proportional to the product of the number and the radius of the particles. With a square law detector, it is possible to derive a signal representative of the surface of the aerosol. With an instrument providing a cube response, one can obtain a reading proportional to the volume of the aerosol. Many other variations in the method of display which are possible to use with the basic detector disclosed herein, will occur to those skilled in the art.

Having described several embodiments of a new and improved particle detector constructed in accordance with the invention, it is believed obvious that other modifications and variations of the present invention are possible in light of the above teachings, and depending upon the purpose of monitoring the atmosphere, different combinations of the particular elements described, may be used. It is therefore to be understood that changes may be made in the particular embodiments of the invention described which are within the full intended scope of the invention, as defined by the appended claims.

What I claim as new and desire to secure by Letters Patent of the United States is:

1. A particle detector including in combination a source of flame combustion, means for applying an electric field across the zone of flame combustion which is less than the breakdown potential of said zone of flame combustion but greater than one-third of said breakdown potential, means for introducing a sample of an atmosphere to be monitored into the zone of flame combustion, and measuring means operatively coupled to the electric field applying means for deriving an output indication of the individual count of the particles present in the atmosphere being monitored.

2. A particle detector including a source of flame combustion, means for introducing a sample of the atmosphere being monitored into the zone of flame combustion, a set of spaced apart electrodes disposed on opposite sides of the zone of flame combustion, means for applying an electric potential between the spaced apart electrodes to thereby produce an electric field across the zone of flame combustion which is less than the breakdown potential of said zone of flame combustion but greater than one-third of said breakdown potential, and measuring means operatively coupled to at least one of the spaced apart electrodes for deriving an output indication of the individual count of the particles present in the atmosphere being monitored.

3. The combustion set forth in claim 2 further characterized by a screening electrode maintained at an electric potential different from the potential of a set of spaced-apart electrodes and positioned intermediate the zone of flame combustion and the electrode to which the measuring means is operatively coupled.

4. A particle detector including in combination a source of flame combustion, means for introducing a sample of the atmosphere to be monitored into the zone of flame combustion, means for applying an electric field across the zone of flame combustion which is less than the breakdown potential of said zone of flame combustion but greater than one-third of said breakdown potential, first measuring means operatively coupled to the electric field applying means for deriving an output indication of the individual count of the particles present in the atmosphere being monitored, photosensitive means positioned to view the zone of flame combustion, light filter means positioned intermediate the photoconductive means and the zone of flame combustion for passing only light within a selected spectral region to the photosensitive means, and second measuring means operatively coupled to the output of the photosensitive means for deriving an output indication of the number of particles in the atmosphere being monitored which emit light in the selected spectral region.

5. The combination set forth in claim 4 wherein the photoconductive means comprises a plurality of photosensitive devices each positioned to view the flame zone through a respective associated light filter designed to pass only light within a selected spectral region with the respective light filters of the several photosensitive devices being designed to pass light from different spectral regions.

6. The combination set forth in claim 4 wherein the photosensitive means comprises a plurality of photosensitive devices each positioned to view the flame zone through a respective associated light filter designed to pass only light within a selected spectral region with the respective light filters of the several photosensitive devices being designed to pass light from different spectral regions, coincidence circuit means operatively coupled to the outputs of at least two of said photosensitive devices, and gating means operatively coupled between the output of at least two photosensitive devices and the measuring means associated therewith, the coincidence circuit means being operatively coupled to said gating means for gating on the measuring means in response to signal pulses being produced concurrently at the output of said at least two photosensitive devices.

7. A particle detector including in combination a combustion chamber having transparent sides, an electrically conductive flame sustaining member, means for supplying fuel and a continuous sample of the atmosphere being monitored to the flame sustaining member whereby a flame of combustion is maintained within the combustion chamber, means for applying a high positive potential to the electrically conductive flame sustaining member, a cylindrical electrically conductive electrode supported within the combustion chamber and spaced from the flame sustaining member, the cylindrical electrode being maintained at a potential different from the potential of the flame sustaining member whereby an electric field is produced across the zone of flame combustion, photosensitive means positioned to view the flame through the transparent sides of the combustion chamber, selective filter means positioned intermediate the flame zone and the photosensitive means, and measuring circuit means operatively coupled to said cylindrical probe and to the photosensitive means for deriving an output indication of the individual count and nature of the particles present in the atmosphere being monitored.

8. The combination set forth in claim 7 wherein the transparent sides of the combustion chamber have an electrically conductive surface, and means for applying a potential to the electrically conductive surface having a value intermediate the value of the potentials applied to the flame sustaining member and the cylindrical electrode.

9. The combination set forth in claim 7 wherein the photosensitive means comprises a plurality of photosensitive devices positioned to view the flame zone through a respective light filter designed to pass light within only a selected spectral region with the filters associated with the different photosensitive devices being designed to pass different spectral regions, and coincidence circuit means operatively coupled to the outputs of all the photosensitive devices and to the measuring circuit means for rendering the measuring circuit means responsive to coincidence in the production of output signals by all of the photosensitive devices.

10. A particle detector including in combination a combustion chamber comprised by a glass envelope surrounding an electrically conductive conduit, means for supplying hydrogen and a continuous sample of the atmosphere being monitored through the conduit to the combustion chamber where combustion takes place, an annular air space surrounding the conduit in the base of the combustion chamber to improve the combustion process, means for drawing off the products of combustion from the combustion chamber, means for applying a high positive potential to the electrically conductive conduit, a cylindrical electrically conductive shell supported within the glass envelope and spaced from the conduit, the cylindrical shell being maintained at a less positive potential than the potential of the conduit whereby an electric field is maintained across the zone of flame combustion, a transparent electrical conductive surface formed around the glass envelope in the vicinity of the zone of flame combustion, means for applying an electric potential to the transparent electrically conductive surface having a value intermediate the value of the potentials applied to the flame sustaining member and the cylindrical electrode, a plurality of photosensitive devices positioned to view the flame zone through the transparent conductive surface, respective light filter means positioned between respective ones of the photosensitive devices and the zone of flame combustion for passing only light within a selected spectral region to its respective photosensitive device, the filter means for the different photosensitive devices being designed to pass different spectral regions, first measuring means operatively coupled to the cylindrical shell for deriving an output indication of the total number of individual particles present in the atmosphere being monitored, and second measuring means operatively coupled to the output of the photosensitive devices for deriving an output indication of the number of particles of a selected element present in the sample being monitored.

11. The combination set forth in claim 10 further characterized by coincidence circuit means operatively coupled to the output of the photosensitive devices, and gating means operatively coupled to the coincidence circuit and between the photosensitive devices and the second measuring means for gating on the second measuring means in response to concurrently produced output signals appearing in the outputs of said photosensitive devices.

12. A particle detector including a source of flame combustion, means for introducing a sample of the atmosphere being monitored into the zone of flame combustion, means for applying an electric field across the zone of flame combustion which is less than the breakdown potential of said zone of flame combustion but greater than one-third of said breakdown potential, a plurality of photosensitive devices positioned to view the flame zone, respective light filter means positioned between respective ones of the photosensitive devices and the zone of flame combustion for passing only light within a selected spectral region to its respective photosensitive device, the filter means for the different photosensitive devices being designed to pass different spectral regions, coincidence circuit means operatively coupled to the output of the photosensitive devices, and measuring means operatively coupled to said photosensitive devices and said coincidence circuit means for deriving output indications of concurrently produced output signals appearing in the outputs of said photosensitive devices.

References Cited

UNITED STATES PATENTS

| | | | |
|---|---|---|---|
| 2,977,479 | 3/1961 | Lauer | 250—218 |
| 3,027,241 | 3/1962 | Andreatch et al. | 23—232 |
| 3,100,264 | 8/1963 | Jaffe et al. | 250—203 |
| 3,129,062 | 4/1964 | Ongkiehong et al. | 23—232 |
| 3,169,832 | 2/1965 | Gallaway et al. | 23—232 |
| 3,175,886 | 3/1965 | Kzreminski et al. | 23—232 |

RALPH G. NILSON, *Primary Examiner.*

J. D. WALL, *Assistant Examiner.*